United States Patent
Yoon et al.

(10) Patent No.: US 8,421,928 B2
(45) Date of Patent: Apr. 16, 2013

(54) SYSTEM AND METHOD FOR DETECTING SCENE CHANGE

(75) Inventors: Young-Suk Yoon, Daejeon (KR); Wonyoung Yoo, Daejeon (KR); Yong-Seok Seo, Daejeon (KR); Sang Kwang Lee, Daejeon (KR); Seunglae Lee, Daejeon (KR); Young Ho Suh, Daejeon (KR); Seunghwan Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 789 days.

(21) Appl. No.: 12/538,554

(22) Filed: Aug. 10, 2009

(65) Prior Publication Data

US 2010/0149424 A1 Jun. 17, 2010

(30) Foreign Application Priority Data

Dec. 15, 2008 (KR) .................. 10-2008-0126923

(51) Int. Cl.
*H04N 5/14* (2006.01)
*G06K 9/46* (2006.01)

(52) U.S. Cl.
USPC .................................... 348/700; 382/232

(58) Field of Classification Search .......... 348/700; 375/240.12
See application file for complete search history.

(56) References Cited

U.S. PATENT DOCUMENTS

| | | | |
|---|---|---|---|
| 5,732,146 A * | 3/1998 | Yamada et al. | 382/107 |
| 6,434,197 B1 * | 8/2002 | Wang et al. | 375/240.29 |
| 6,449,392 B1 * | 9/2002 | Divakaran et al. | 382/235 |
| 6,731,684 B1 * | 5/2004 | Wu | 375/240.12 |
| 8,300,696 B2 * | 10/2012 | Liang et al. | 375/240.16 |
| 2003/0107676 A1 | 6/2003 | Jang | |
| 2003/0126604 A1 | 7/2003 | Suh | |
| 2004/0008284 A1 | 1/2004 | Kim | |
| 2007/0132886 A1 | 6/2007 | Jang | |
| 2007/0139566 A1 | 6/2007 | Suh | |
| 2007/0146549 A1 | 6/2007 | Suh | |
| 2007/0201746 A1 | 8/2007 | Kim | |

(Continued)

FOREIGN PATENT DOCUMENTS

| | | |
|---|---|---|
| JP | 06-250699 | 9/1994 |
| JP | 2004-007138 | 1/2004 |

(Continued)

OTHER PUBLICATIONS

"On the Use of Computable Features for Film Classification," Zeeshan Rasheed et al., IEEE Transactions on Circuit and Systems for Video Technology, vol. 1, No. 11, Sep. 2003.

*Primary Examiner* — Jayanti K Patel
*Assistant Examiner* — Jessica Prince
(74) *Attorney, Agent, or Firm* — Staas & Halsey LLP (57) ABSTRACT

The present invention relates to a system for scene change detection including a decoder decoding input digital video data into video data compressed by a single codec or uncompressed video data in a codec-independent format, a normalizer normalizing the video data decoded by the decoder in a temporally and spatially uniform format, and a scene change detector computing a mode ratio for each frame of the normalized video data through a mode determination, and determining, when a frame has a mode ratio higher than a preset threshold value, that a scene change has occurred at the frame. The decoder decodes video data compression-coded by various video codecs into uncompressed video frames.

18 Claims, 5 Drawing Sheets

U.S. PATENT DOCUMENTS

2007/0274385 A1* 11/2007 He .......................... 375/240.12
2008/0089416 A1* 4/2008 Jeon ........................ 375/240.15
2008/0266457 A1 10/2008 Sasakura

FOREIGN PATENT DOCUMENTS

| | | |
|---|---|---|
| JP | 2004-40808 | 2/2004 |
| KE | 10-2002-0075956 | 10/2002 |
| KR | 10-2003-0035716 | 5/2003 |
| KR | 10-2003-0056783 | 7/2003 |
| WO | 03/028236 | 4/2003 |
| WO | 2007/066924 | 6/2007 |
| WO | 2007/142646 | 12/2007 |

* cited by examiner

*FIG.4A*
(VERTICAL)

*FIG.4B*
(HORIZONTAL)

*FIG.4C*
(DC)

*FIG.4D*
(DIAGONAL DOWN-LEFT)

*FIG.4E*
(DIAGONAL DOWN-RIGHT)

*FIG.4F*
(VERTICAL-RIGHT)

FIG. 4G (HORIZONTAL-DOWN)

FIG. 4H (VERTICAL-LEFT)

FIG. 4I (HORIZONTAL-UP)

FIG.5

SYSTEM AND METHOD FOR DETECTING SCENE CHANGE

CROSS-REFERENCE(S) TO RELATED APPLICATIONS

The present invention claims priority of Korean Patent Application No. 10-2008-0126923, filed on Dec. 15, 2008, which is incorporated herein by reference.

FIELD OF THE INVENTION

The present invention relates to video processing for a digital video device and, more particularly, to a system and method for scene change detection wherein input digital video data is decoded and normalized, optimum modes are determined for each normalized frame, a mode ratio is calculated for scene change detection on the basis of the determined optimum modes, the calculated mode ratio is corrected for local errors, and the corrected mode ratio is used to detect a scene change.

BACKGROUND OF THE INVENTION

Uncompressed digital video data used by a regular digital video device has a very large size, and normally includes multiple scenes, where each scene is composed of a set of similar frames, and therefore, detection of a scene change can be beneficial to digital video processing.

Scene change detection is necessary for functions related to extracting key frame, highlighting, and indexing in a digital video sequence. These functions can be widely utilized in personal devices such as camcorders, video recorders and video players, and in specialized systems for digital video browsing, recognition, tracking, monitoring and intrusion blocking, and the like.

Currently, scene change detection is used in diverse multimedia services based on digital videos in relation to highlight editing, scene segmentation, categorization, recognition, browsing, monitoring, blocking and tracking, etc.

There are many existing approaches to scene change detection. For example, in one approach for video file identification, an input video sequence is subdivided into still images, a key image is semi-automatically selected in accordance with user needs or administrator needs, a set of video files are selected on the basis of the key image, and the images of the input video sequence are compared with those of the selected video files to find a match.

In another approach, the differential value of mean absolute difference between image frames is calculated, and thresholding is applied to the calculated differential value to detect a scene change. Scene change information of the previous frame is utilized to detect a scene change in the current frame.

In yet another approach, one-dimensional histograms of Y, Cb and Cr values of pixels are computed for each video frame, and a ratio of distances between the histograms of consecutive frames is used to detect a scene change.

In still another approach for an MPEG compression-coded video stream, histograms are derived nonlinearly from DC coefficients of I frames in accordance with visual properties, and distances therebetween are used to detect a scene change.

In a further approach, differences between color histograms of three consecutive frames are computed, and arrangement properties of the differences are used to detect a scene change. In addition, the distribution of macroblock types is analyzed to verify the presence of a scene change.

In a still further approach, luminance and chrominance histograms of consecutive frames are derived, and the cross-correlation therebetween is used to detect a scene change.

In another approach for an MPEG compression-coded video stream, edge information is derived using DCT AC coefficients, and variations of the edge information are used to detect a scene change. To reduce false detections due to object motion, after motion compensation is performed, a comparison is made between histograms of edge images to measure variations.

In yet another approach, errors resulting from estimation of motion vectors in video compression are used to detect a scene change.

In still another approach for indexing key frames using adaptive scene change detection, videos are categorized into genres including football, news, music, document, animation, and show. Then, for a video stream, local variance, histogram, entropy coding and camera motion are selectively utilized in accordance with each of the genres to detect a scene change.

In a further approach, the ratio of the sum of absolute pixel differences to the sum of absolute histogram differences, between consecutive frames, is used to detect a scene change.

A still further approach computes the rate that pixel variations between consecutive frames are larger than a threshold value, and uses a scene change detection filter to check an occurrence of a scene change.

Another approach for an MPEG compression-coded video stream computes mean-square differences between pixel values of DCT coefficients for I frames, counts the number of forward-predicted macroblocks for P frames, and counts the number of forward-predicted macroblocks and the number of backward-predicted macroblocks for B frames, to detect a scene change.

In another approach, various computable video features are proposed to classify films into genres. To detect a scene change, HSV color histograms of 16 bins (8 for the hue, 4 for the saturation, and 4 for the value components of the HSV color space) are calculated for each frame, and the intersection of the histograms of consecutive frames is computed and anisotropic diffusion algorithm is applied to detect seen changes. The detected scene changes are used to classify films into genres.

As described above, there are many existing schemes for scene change detection. However, in the existing schemes, spatial and temporal redundancy in a video stream is not utilized, and various local errors that may happen in a certain video stream are not handled adequately.

Existing systems for scene change detection may be unable to set a scene detection state in accordance with the system characteristics and properties of a digital video. Hence, considering the time taken for analysis and determination related to scene detection, they may produce poor scene detection results.

SUMMARY OF THE INVENTION

It is, therefore, a primary object of the present invention to provide a system and method for scene change detection wherein input digital video data is decoded into video data compressed by a single codec or uncompressed video data in a codec-independent format, the decoded video data is normalized, and a scene change is detected using the normalized video data.

It is, therefore, another object of the present invention to provide a system and method for scene change detection wherein input digital video data is decoded into video data compressed by a single codec or uncompressed video data in a given format, the decoded video data is normalized, the optimum mode is determined for each normalized frame, a mode ratio is calculated for scene change detection on the basis of the determined optimum modes, the calculated mode ratio is corrected for local errors, and the corrected mode ratio is used to detect a scene change.

In accordance with one aspect of the invention, there is provided a system for scene change detection including a decoder decoding input digital video data into video data compressed by a single codec or uncompressed video data in a codec-independent format; a normalizer normalizing the video data decoded by the decoder in a temporally and spatially uniform format; and a scene change detector computing a mode ratio for each frame of the normalized video data through a mode determination, and determining, when a frame has a mode ratio higher than a preset threshold value, that a scene change has occurred at the frame.

It is desirable that the decoder decodes video data compression-coded by various video codecs into uncompressed video frames.

It is also desirable that a control signal carrying information on a frame size, a frame rate, and a color space of the decoded video data is inputted to the normalizer, so that the normalizer determines a frame format of the decoded video data based on the control signal.

It is preferable that the scene change detector includes an optimum mode determiner determining an optimum mode by computing a cost function for all modes of normalized frames outputted from the normalizer and finding a mode having a minimum value of the cost function values; a mode ratio calculator calculating a mode ratio based on the determined optimum mode for scene change detection; an error corrector correcting the calculated mode ratio in consideration of errors possibly causing false scene change detection in a current frame in which the mode ratio is calculated; and a scene change determiner determining whether a scene change has occurred at the current frame on the basis of the corrected mode ratio.

It is also preferable that the optimum mode determiner determines a motion vector and a reference image for each of inter-modes and intra-modes, computes a rate-distortion cost function for each mode, and determines a mode with the least cost function value as the optimum mode.

It is preferred that the optimum mode determiner determines a motion vector with the least value and a reference image for 16×16, 16×8 and 8×16 mode, determines a motion vector and a reference image for 8×8, 8×4, 4×8 and 4×4 mode in each 8×8 block of P8×8 mode, and determines a motion vector for SKIP mode, and then determines a motion vector and a reference image for each intra-mode.

It is also preferred that the inter-modes and intra-modes are supported for macroblock modes of H.264/AVC.

It is still desirable that the mode ratio calculator produces a intra mode ratio by dividing the number of intra-modes in a frame having the optimum mode through the optimum mode determiner by a weighted sum of the number of intra-modes and the number of inter-modes.

It is still preferable that the error corrector corrects the mode ratio by removing errors of local maximums and minimums generated in images of fast scene change.

It is still preferred that the scene change determiner checks the corrected mode ratio of the current frame and determines, when the current frame is more coded in intra-modes than in inter-modes, that a scene change has occurred at the current frame.

In accordance with another aspect of the invention, there is provided a method of scene change detection, including decoding input digital video data into video data compressed by a single codec or uncompressed video data in a codec-independent format; normalizing the decoded video data in a temporally and spatially uniform format; and computing a mode ratio for each frame of the normalized video data through a mode determination, and determining, when a frame has a mode ratio higher than a preset threshold value, that a scene change has occurred at the frame.

It is desirable that the decoding input digital video data includes decoding video data compression-coded by various video codecs into uncompressed video frames.

It is also desirable that the normalizing the decoded video data includes determining a frame format of the decoded video data in accordance with an inputted control signal carrying information on a frame size, a frame rate, and a color space of the decoded video data.

It is still desirable that the computing and determining that a scene change has occurred includes determining an optimum mode by computing a cost function for all modes of the normalized frames and finding a mode having a minimum value of the cost function values; calculating a mode ratio based on the determined optimum mode for scene change detection; correcting the calculated mode ratio in consideration of errors possibly causing false scene change detection in a current frame in which the mode ratio is calculated; and determining whether a scene change has occurred at the current frame on the basis of the corrected mode ratio.

It is preferable that the determining the optimum modes includes determining a motion vector and a reference image for each of inter-modes and intra-modes; computing a rate-distortion cost function for each mode; and determining a mode with the least cost function value as the optimum mode.

It is also preferable that the determining a motion vector and reference image includes determining a motion vector with the least value and a reference image for 16×16, 16×8 and 8×16 mode; determining a motion vector and a reference image for 8×8, 8×4, 4×8 and 4×4 mode in each 8×8 block of P8×8 mode; and determining a motion vector for SKIP mode, and then determining a motion vector and a reference image for each intra-mode.

It is still preferable that the inter-modes and intra-modes are supported for macroblock modes of H.264/AVC.

It is preferred that the calculating a intra mode ratio includes producing the mode ratio by dividing the number of intra-modes in a frame having the optimum mode through the optimum mode determiner by a weighted sum of the number of intra-modes and the number of inter-modes.

It is also preferred that the correcting the calculated mode ratio includes correcting the mode ratio by removing effects of local maximums and minimums generated in images of fast scene change.

It is still preferred that the determining whether the scene change has occurred at the current frame includes checking the corrected mode ratio of the current frame and determining, when the frame is more coded in intra-modes than in inter-modes, that a scene change has occurred at the current frame.

In a feature of the present invention, the performance of scene change detection can be enhanced using spatial and temporal redundancy in a digital video, and various local errors that may happen in a video stream can be handled flexibly. In addition, a scene detection state can be set in accordance with system characteristics and properties of a digital video, thereby producing high scene change detection rates.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings so that they can be readily implemented by those skilled in the art.

The present invention relates to scene change detection in digital videos by decoding input digital video data into video data compressed by a single codec or uncompressed video data in a codec-independent format, normalizing the decoded video data, and checking occurrence of a scene change in normalized frames. To achieve this, optimum modes are determined for each normalized frame, a mode ratio is calculated for scene change detection on the basis of the determined optimum modes, and the calculated mode ratio is corrected for errors and used to detect a scene change.

Figure 1:
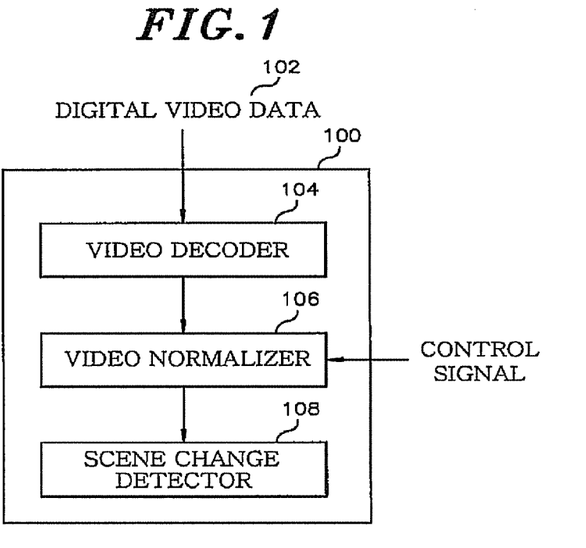
FIG. 1 describes a schematic block diagram of a scene change detection system in accordance with an embodiment of the present invention.

FIG. 1 describes a block diagram of a scene change detection system 100 in accordance with the embodiment of the present invention.

Referring to FIG. 1, the scene change detection system 100 includes a video decoder 104, a video normalizer 106, and a scene change detector 108.

The video decoder 104 decodes input digital video data 102 into uncompressed video data. The digital video data 102 may have variable formats (codecs), bit rates, frame rates, and sizes, etc. There are many video coding schemes that can compress uncompressed video data into digital video data. In this embodiment, scene change detection is carried out using uncompressed video data in order to achieve independence from different video coding schemes.

In addition, to handle the diversity in video format, decoded video data is preprocessed or normalized by the video normalizer 106 before scene change detection. Then, the normalized video data is inputted to the scene change detector 108, which detects a scene change that can be utilized for various applications and systems.

Specifically, the video decoder 104 denotes software and hardware having a decoder capable of decoding all types of compressed videos. As the digital video data 102 may have been compressed by various codecs, the video decoder 104 converts, by decoding, input video data into video data compressed by a single codec or uncompressed video data in a uniform format. Because digital video compression is lossy in most cases, recovered video data by decoding may be not identical to the original uncompressed video data before compression. However, through this decoding process, the scene change detection system 100 can perform scene change detection independently from diverse digital video formats or codecs.

As described above, the digital video data 102 may vary in codec, bit rate, frame rate, and size. The codec is related to file formats and compression schemes, and hence affects the digital video data 102. The bit rate depends on the degree of video compression, and is closely related to video quality. The frame rate is the number of frames that are projected or displayed per second, is typically 24 Hz to 30 Hz, and can vary in accordance with specific purposes. The size is represented by frame length and frame width, and is normally in the range of 160×120 pixels to 1920×1080 pixels.

The video normalizer 106 determines the frame size, frame rate, and color space, etc. in decoded digital video data in accordance with an externally supplied control signal, and can use a specific filter to suppress noise or enhance system performance in accordance with the control signal.

A video sequence includes a set of frames continuous in time, and is, semantically, composed of multiple scenes and each scene is composed of consecutive frames. A scene change occurs between scenes. Unlike between consecutive frames belonging to the same scene, the correlation between the frame immediately before occurrence of a scene change and the frame immediately after occurrence of the scene change is significantly low. A low correlation between two consecutive frames is also useful information for the codec compressing digital video data.

In general, during digital video compression, two consecutive frames belonging to the same scene are closely related, and require an average amount of information or bit rate. When a scene change occurs between two consecutive frames, the two frames require a larger amount of information or a higher bit rate for compression. The scene change detector 108 detects a scene change using these facts. In a sense, the scene change detection system 100 including the scene change detector 108 is implemented on the basis of semantic similarity between scene change detection and digital video compression.

Figure 2:
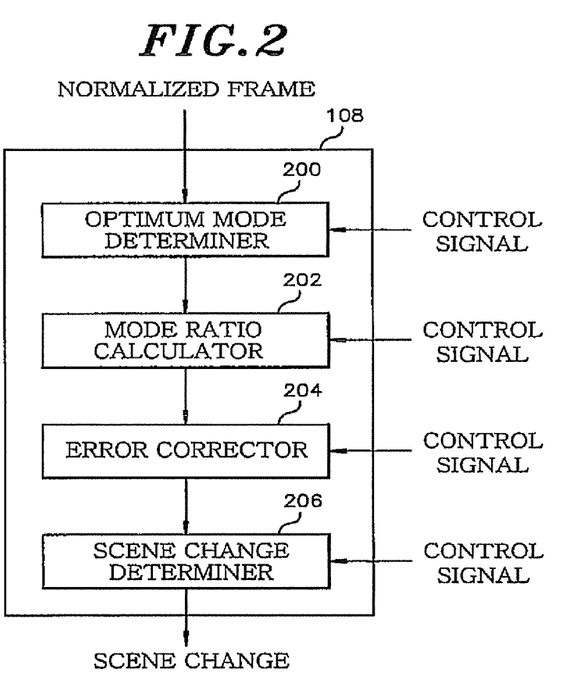
FIG. 2 shows a block diagram of a scene change detector in the system of FIG. 1.

FIG. 2 shows a block diagram of the scene change detector 108 in the scene change detection system 100.

Referring to FIG. 2, the scene change detector 108 includes an optimum mode determiner 200, a mode ratio calculator 202, an error corrector 204, and a scene change determiner 206.

Data inputted to the scene change detector 108 is normalized frames from the video normalizer 106. The normalized frames are video frames that are normalized temporally and spatially so as to have the same format. Normalized frames from the video normalizer 106 are inputted to the optimum mode determiner 200. The optimum mode determiner 200 performs a function similar to the optimum mode determining function defined in H.264/AVC, and does not encode digital video data in H.264 format but finds only optimum modes being necessary for scene change detection.

The found optimum modes are inputted to the mode ratio calculator 202, and are used to calculate a mode ratio for scene change detection. The error corrector 204 corrects the calculated mode ratio with respect to possible errors. The scene change determiner 206 determines whether the corresponding frame is related to a scene change, using the corrected mode ratio.

Specifically, H.264/AVC being the most recent video compression standard includes various techniques such as motion estimation, mode determination, bit rate control and entropy coding, etc. to remove redundancies in a video sequence. The H.264 encoder consumes a lot of resources in the motion estimation and the mode determination during coding. This indicates that the motion estimation and the mode determination are very important for increasing coding efficiency and decreasing redundancy. In H.264, variable-sized blocks are used for motion compensation and the mode is determined so as to ensure acceptable quality and minimum number of bits. In motion compensation using variable-sized blocks, a macroblock is divided into variable-sized blocks so as to increase coding efficiency by adequately reflecting image properties. Macroblock modes are determined using rate distortion optimization.

Figure 3:
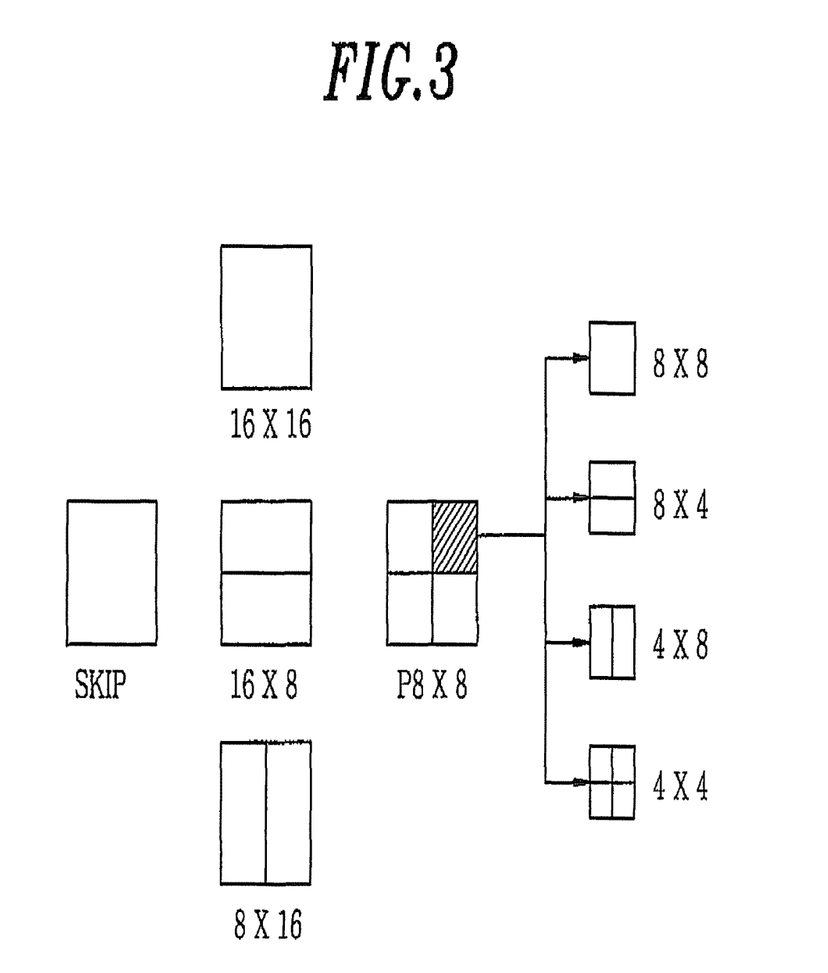
FIG. 3 illustrates types of inter-modes.
Figure 4A:
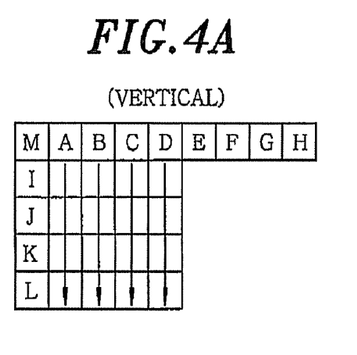
FIGS. 4A to 4I depict prediction schemes for an intra-mode I4×4.
Figure 4B:
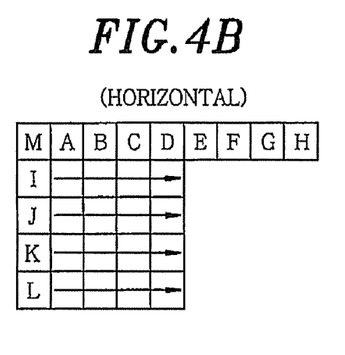
Figure 4C:
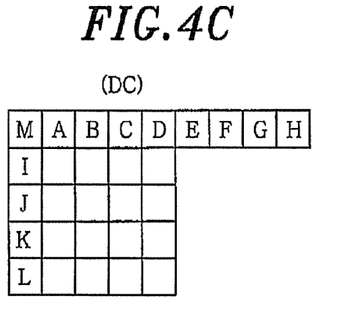
Figure 4D:
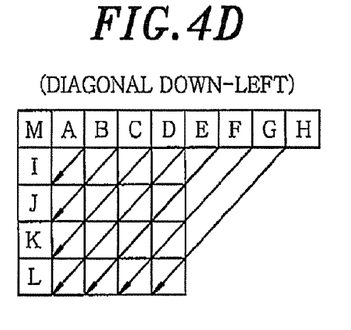
Figure 4E:
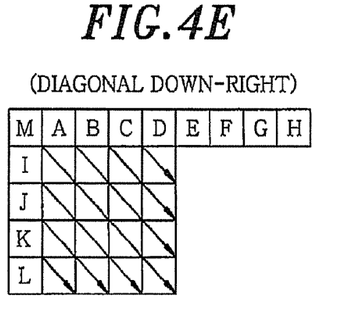
Figure 4F:
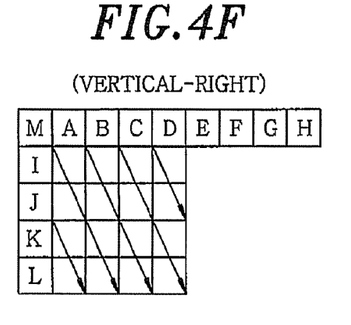
Figure 4G:
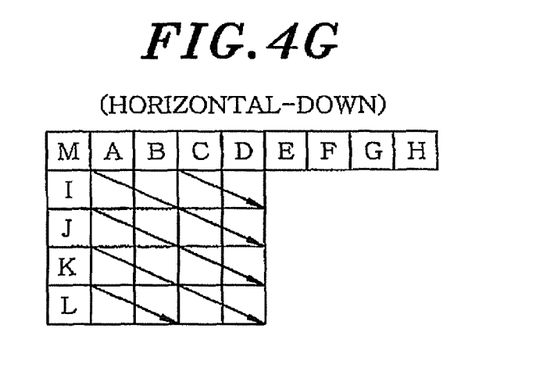
Figure 4H:
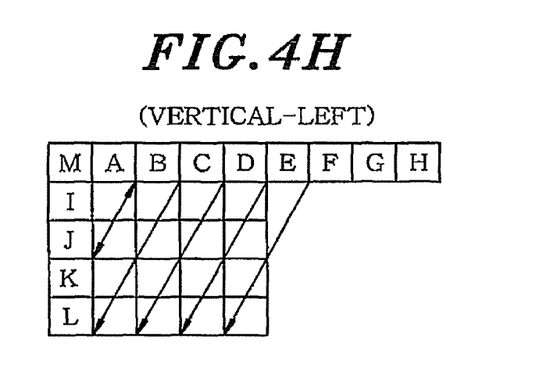
Figure 4I:
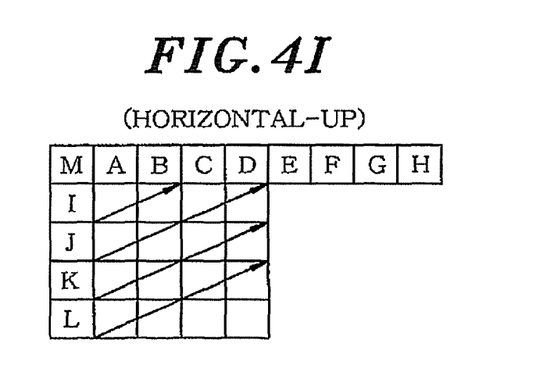

FIG. 3 illustrates types of inter-modes, and FIGS. 4A-4I illustrate prediction schemes for an intra-mode I4×4.

H.264/AVC supports five inter-modes and three intra-modes for macroblock mode. As shown in FIG. 3, SKIP, 16×16, 16×8, 8×16 and P8×8 correspond to inter-mode, and are used to encode a macroblock through the motion estimation. In P8×8 mode, each 8×8 block can be divided into 8×8, 8×4, 4×8, and 4×4.

I16×16, I8×8 and I4×4 are intra-mode, and are used as reference when neighbor pixel values are coded in various directions. FIGS. 4A to 4I illustrate schemes for predicting neighbor pixel values in various directions for the intra-mode I4×4.

Determination of macroblock mode is very important for the H.264 encoder. H.264 is distinct from prior compression-coding approaches in that a Lagrangian rate-distortion cost function considering both distortion degree and encoding bits is used to find the optimum mode. The Lagrangian function used for determining the motion vector of a variable block and for macroblock mode is composed of the distortion degree, a Lagrangian coefficient which is a weighted value of the number of the encoding bits, and an amount of the encoding bits.

In the present invention, a rate-distortion cost is calculated for each macroblock mode using the Lagrangian rate distortion cost function. For inter-mode, a motion vector and a reference image should be determined before calculation of the rate-distortion cost. For multiple blocks, the motion vector and the reference image minimizing the value of Equation 1 is determined.

$$J_{motion}(MV,REF|\lambda_{motion}) = c_1 \cdot f(s, r(MV,REF)) + c_2 \cdot \lambda_{motion} \cdot g(MV,REF),$$ [Equation 1]

where MV denotes the motion vector, REF denotes the reference image, $\lambda_{motion}$ denotes a Lagrange multiplier associated with a quantization parameter value, s denotes an original image, r denotes an image compensated by the image estimation, $f$ denotes a function related to an error level, $g$ denotes a function related to the number of encoding bits, and $c_1$ and $c_2$ are weights for functions $f$ and $g$, respectively. The weights $c_1$ and $c_2$ and functions $f$ and $g$ are selected in accordance with the use and purpose of the scene change detection system 100, and are given as control signals.

To determine the optimum sub-macroblock mode for each 8×8 block in P8×8 mode, and to determine the optimum prediction direction in intra-mode and the optimum mode for a macroblock, the minimum value of Equation 2 is calculated and used.

$$J_{mod\ e}(s, r, MODE f|\lambda_{mod\ e}) = c_3 \cdot i(s, r, MODE) + c_4 \cdot \lambda_{mod\ e} \cdot i(s, r, MODE),$$ [Equation 2]

where MODE indicates a macroblock mode, a prediction direction mode or a sub-macroblock mode, $\lambda_{mod\ e}$ indicates the square of $\lambda_{motion}$, h denotes a function related to the error level and i denotes a function related to the number of encoding bits in the case of coding based on MODE, and $c_3$ and $c_4$ are weights for functions h and i, respectively. The weights $c_3$ and $c_4$ and functions h and i are selected in accordance with the use and purpose of the scene change detection system 100, and are given as control signals. The variables and functions used in Equation 1 and Equation 2 are fed as control signals to the optimum mode determiner 200.

Figure 5:
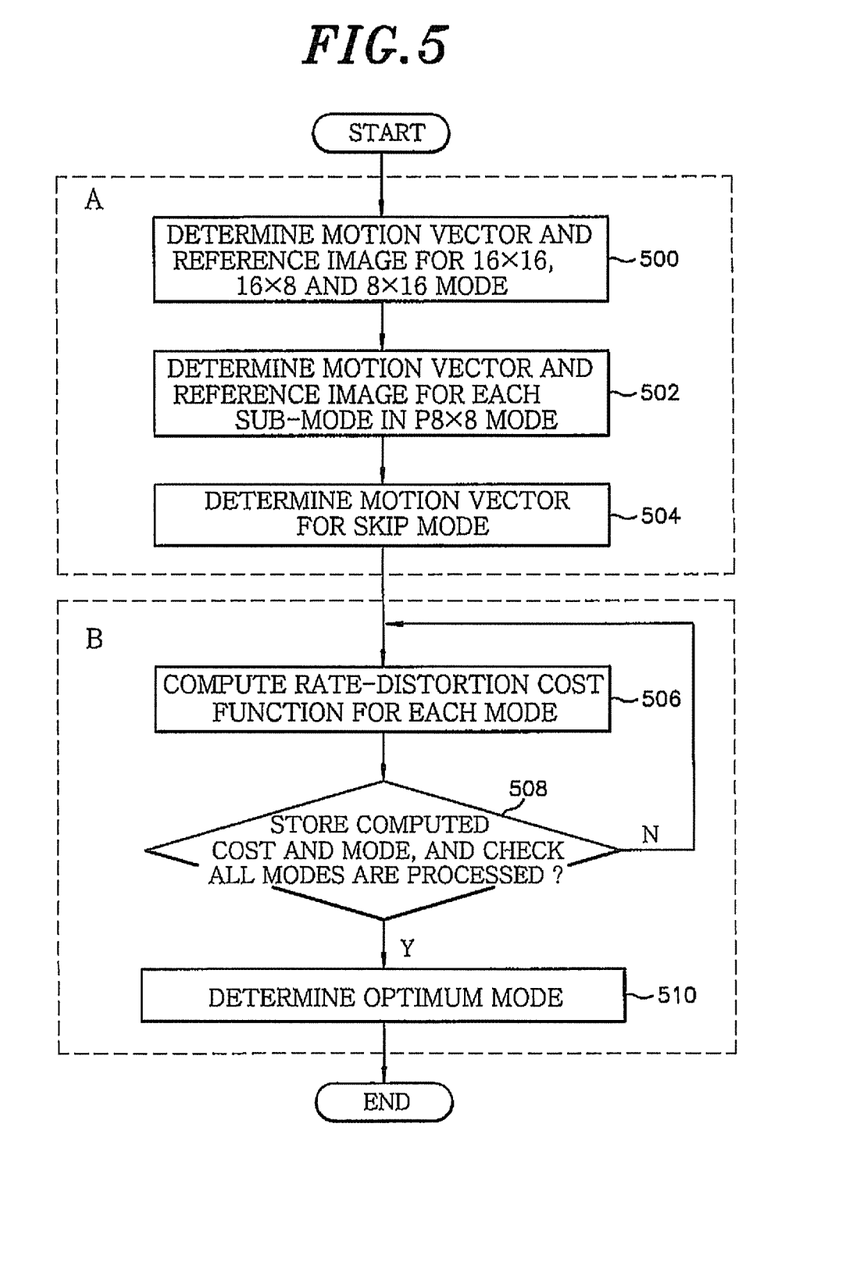
FIG. 5 is a flow chart for illustrating a procedure of optimum mode determination.

FIG. 5 is a flow chart for illustrating a procedure of optimum mode determination.

The procedure of FIG. 5 is performed by the optimum mode determiner 200, and includes part A to determine a motion vector and a reference image for inter-mode and part B to determine the optimum mode. Referring to FIG. 5, at step 500, for each of 16×16, 16×8 and 8×16 mode, the motion vector and the reference image producing the minimum value of Equation 1 is determined and stored. At step 502, sub-modes of P8×8 mode illustrated in FIG. 3 are handled. That is to say, for each of 8×8, 8×4, 4×8 and 4×4 mode, the motion vector and the reference image are selected, and selection results are used later for optimum mode determination. At step 504, the motion vector for SKIP mode is computed, and then an optimum mode is determined in part B. Further, at step 506, for a selected mode, the rate-distortion cost function is computed, and then, at step 508, the computed cost and associated mode are stored, and whether all modes including intra-modes are processed is checked. If not all modes are processed, a next mode is selected and step 506 is repeated. If all modes are processed, at step 510, one of the modes with the least cost is determined as the optimum mode.

In the present invention, information on determined optimum modes is used for scene change detection. In inter-mode, the correlation between successive frames is high, such that the current frame is recovered using neighbor frames. On the other hand, in intra-mode, as the correlation between successive frames is low, the current frame is recovered using information from similar neighbor pixels as shown in FIGS. 4A-4I. Hence, when a specific frame is mostly coded with inter-mode, it is highly probable that the frame and previous frame belong to the same scene. When a particular frame is mostly coded with intra-mode, it is highly probable that the frame is associated with a scene change. This property is used for scene change detection. The intra-mode ratio usable for scene change detection can be computed using the below Equation 3.

$$IMR_n = \frac{c_5 \cdot N(INTRAMODE_n)}{N(INTERMODE_n) + c_4 \cdot N(INTRAMODE_n)},$$ [Equation 3]

where IMR denotes the intra-mode ratio, n indicates the n-th frame, $N(INTRAMODE_n)$ and $N(INTERMODE_n)$ are respectively the number of intra-modes and the number of inter-modes in the n-th frame, $c_4$ and $c_5$ are weight coefficients for $N(INTRAMODE_n)$ and $N(INTERMODE_n)$, respectively and $c_5$ is non-zero. The weight coefficients are used as a control signal for the mode ratio calculator 202.

The mode ratio computed by the mode ratio calculator 202 is inputted to the error corrector 204. The error corrector 204 corrects errors (local maximums and minimums, and the like) in the mode ratio by removing effects due to sudden brightness variations (flash, lightning and explosion), fast camera movement, zoom in, zoom out, slow motion captured by a camera having high-speed shutter, animation of a low frame rate, and fast scene change in a commercial film, etc. The error corrector 204 can be composed of a combination of various digital filters including existing filters removing the local maximums and minimums or suitable filters in the scene change detection system 100. Control signals inputted to the error corrector 204 includes selection signals and control signals for the filters in the scene change detection system 100. The error corrector 204 may be varied in accordance with the system properties, and have a different configuration and location corresponding to the accuracy, use, and purpose of the system.

The corrected mode ratio from the error corrector 204 is inputted to the scene change determiner 206, which then determines whether a scene change has occurred on the basis of the corrected mode ratio. The scene change determiner 206 can determine that a scene change has occurred at a frame when the frame has a mode ratio higher than a preset threshold value. The threshold value may be set to a fixed value in accordance with the properties of the scene change detection system 100, a value derived using mode ratios of previous frames, or a value obtained through a machine learning approach that learns situations where a scene change occurs in various digital videos. Control signals inputted to the scene change determiner 206 include necessary parameters or variables for setting a procedure computing the threshold value.

As described above, in the present invention, for scene change detection in a digital video, input digital video data is decoded into uncompressed video data in a codec-independent format, the decoded video data is normalized, and occurrence of a scene change is checked in normalized frames. To achieve this, optimum modes are determined for each normalized frame, a mode ratio is calculated on the basis of the determined optimum modes, and the calculated mode ratio is corrected for errors and used to detect a scene change in the frame.

While the invention has been shown and described with respect to the embodiments, it will be understood by those skilled in the art that various changes and modifications may be made without departing from the scope of the invention as defined in the following claims.

What is claimed is:

1. A system for scene change detection, comprising:
   a decoder to decode input digital video data into video data compressed by a single codec or uncompressed video data in a codec-independent format;
   a normalizer to normalize the video data decoded by the decoder in a temporally and spatially uniform format; and
   a scene change detector to compute a mode ratio for each frame of the normalized video data through a mode determination, and to determine, when a frame has a mode ratio higher than a preset threshold value, that a scene change has occurred at the frame,
   wherein the scene change detector comprises:
   an optimum mode determiner to determine an optimum mode by computing a cost function for all modes of normalized frames outputted from the normalizer and to find a mode having a minimum value of the cost function values;
   a mode ratio calculator to calculate a mode ratio based on the determined optimum mode for scene change detection;
   an error corrector to correct the calculated mode ratio in consideration of errors possibly causing false scene change detection in a current frame in which the mode ratio is calculated; and
   a scene change determiner to determine whether a scene change has occurred at the current frame on the basis of the corrected mode ratio.

2. The system of claim 1, wherein the decoder decodes video data compression-coded by various video codecs into uncompressed video frames.

3. The system of claim 1, wherein a control signal carrying information on a frame size, a frame rate, and a color space of the decoded video data is inputted to the normalizer, so that the normalizer determines a frame format of the decoded video data based on the control signal.

4. The system of claim 1, wherein the optimum mode determiner determines a motion vector and a reference image for each of inter-modes and intra-modes, computes a rate-distortion cost function for each mode, and determines a mode with the least cost function value as the optimum mode.

5. The system of claim 4, wherein the optimum mode determiner determines a motion vector with the least value and a reference image for 16×16, 16×8 and 8×16 mode, determines a motion vector and a reference image for 8×8, 8×4, 4×8 and 4×4 mode in each 8×8 block of P8×8 mode, and determines a motion vector for SKIP mode, and then determines a motion vector and a reference image for each intra-mode.

6. The system of claim 4, wherein the inter-modes and intra-modes are supported for macroblock modes of H.264/AVC.

7. The system of claim 1, wherein the mode ratio calculator produces a intra mode ratio by dividing the number of intra-modes in a frame having the optimum mode through the optimum mode determiner by a weighted sum of the number of intra-modes and the number of inter-modes.

8. The system of claim 1, wherein the error corrector corrects the mode ratio by removing errors of local maximums and minimums generated in images of fast scene change.

9. The system of claim 1, wherein the scene change determiner checks the corrected mode ratio of the current frame and determines, when the current frame is more coded in intra-modes than in inter-modes, that a scene change has occurred at the current frame.

10. A method of scene change detection, comprising:
    decoding input digital video data into video data compressed by a single codec or uncompressed video data in a codec-independent format;
    normalizing the decoded video data in a temporally and spatially uniform format; and
    computing a mode ratio for each frame of the normalized video data through a mode determination, and determining, when a frame has a mode ratio higher than a preset threshold value, that a scene change has occurred at the frame,
    wherein the computing and determining that a scene change has occurred comprises:
    determining an optimum mode by computing a cost function for all modes of the normalized frames and finding a mode having a minimum value of the cost function values;
    calculating a mode ratio based on the determined optimum mode for scene change detection;
    correcting the calculated mode ratio in consideration of errors possibly causing false scene change detection in a current frame in which the mode ratio is calculated; and
    determining whether a scene change has occurred at the current frame on the basis of the corrected mode ratio.

11. The method of claim 10, wherein the decoding input digital video data comprises decoding video data compression-coded by various video codecs into uncompressed video frames.

12. The method of claim 10, wherein the normalizing the decoded video data comprises determining a frame format of the decoded video data in accordance with an inputted control signal carrying information on a frame size, a frame rate, and a color space of the decoded video data.

13. The method of claim 10, wherein the determining the optimum modes comprises:
- determining a motion vector and a reference image for each of inter-modes and intra-modes;
- computing a rate-distortion cost function for each mode; and
- determining a mode with the least cost function value as the optimum mode.

14. The method of claim 13, wherein the determining a motion vector and reference image comprises:
- determining a motion vector with the least value and a reference image for 16×16, 16×8 and 8×16 mode;
- determining a motion vector and a reference image for 8×8, 8×4, 4×8 and 4×4 mode in each 8×8 block of P8×8 mode; and
- determining a motion vector for SKIP mode, and then determining a motion vector and a reference image for each intra-mode.

15. The method of claim 13, wherein the inter-modes and intra-modes are supported for macroblock modes of H.264/AVC.

16. The method of claim 10, wherein the calculating a intra mode ratio comprises producing the mode ratio by dividing the number of intra-modes in a frame having the optimum mode through the optimum mode determiner by a weighted sum of the number of intra-modes and the number of inter-modes.

17. The method of claim 10, wherein the correcting the calculated mode ratio comprises correcting the mode ratio by removing effects of local maximums and minimums generated in images of fast scene change.

18. The method of claim 10, wherein the determining whether the scene change has occurred at the current frame comprises checking the corrected mode ratio of the current frame and determining, when the frame is more coded in intra-modes than in inter-modes, that a scene change has occurred at the current frame.

* * * * *